(12) United States Patent
Lu et al.

(10) Patent No.: US 9,452,843 B1
(45) Date of Patent: Sep. 27, 2016

(54) INFLATING ROTORCRAFT EXTERNAL AIRBAGS IN STAGES

(71) Applicant: Bell Helicopter Textron Inc., Fort Worth, TX (US)

(72) Inventors: Zi Lu, Coppell, TX (US); Michael Seifert, Southlake, TX (US); Cheng-Ho Tho, Irving, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 14/711,230

(22) Filed: May 13, 2015

(51) Int. Cl.
*B64D 25/00* (2006.01)
*B64C 25/56* (2006.01)
*B64C 25/32* (2006.01)

(52) U.S. Cl.
CPC .............. *B64D 25/00* (2013.01); *B64C 25/32* (2013.01); *B64C 25/56* (2013.01); *B64D 2201/00* (2013.01)

(58) Field of Classification Search
CPC .. B64D 25/00; B64D 2201/00; B64C 25/32; B64C 25/56
USPC .................................. 701/3, 45; 244/100 A
See application file for complete search history.

(56) References Cited

U.S. PATENT DOCUMENTS

| | | | | |
|---|---|---|---|---|
| 5,259,574 A * | 11/1993 | Carrot | ...................... | B64C 25/56 244/100 A |
| 5,560,568 A * | 10/1996 | Schmittle | ................ | B64C 3/385 244/110 E |
| 5,765,778 A * | 6/1998 | Otsuka | ..................... | B64C 25/56 244/100 A |
| 5,992,794 A * | 11/1999 | Rotman | ................... | B64C 25/32 244/138 R |
| 6,227,325 B1 * | 5/2001 | Shah | ..................... | B60R 19/205 180/274 |
| 6,749,218 B2 * | 6/2004 | Breed | .................... | G08G 1/163 280/735 |
| 6,857,495 B2 * | 2/2005 | Sawa | ...................... | B60R 21/36 180/274 |
| 6,950,014 B2 * | 9/2005 | Rao | ......................... | B60R 21/36 340/435 |
| 6,955,238 B2 * | 10/2005 | Takimoto | ............ | B60R 21/2338 180/274 |
| 7,073,619 B2 * | 7/2006 | Alexander | .......... | B60R 21/2338 180/274 |
| 7,954,752 B2 | 6/2011 | Smith et al. | | |
| 8,348,192 B2 | 1/2013 | Tho et al. | | |
| 8,418,957 B2 | 4/2013 | Smith et al. | | |
| 8,474,753 B2 * | 7/2013 | Hill | ........................ | B64D 25/00 244/100 A |
| 8,588,996 B2 * | 11/2013 | Hill | ........................ | B64D 25/00 244/100 A |
| 2010/0044507 A1 * | 2/2010 | Smith | ................... | B64C 27/006 244/110 R |
| 2010/0206983 A1 * | 8/2010 | Tho | ......................... | B64C 25/52 244/100 A |
| 2011/0204181 A1 * | 8/2011 | Hill | ........................ | B64D 25/00 244/100 A |
| 2015/0039159 A1 * | 2/2015 | Litwinowicz | .......... | B64C 19/00 701/3 |

* cited by examiner

*Primary Examiner* — Thomas Tarcza
*Assistant Examiner* — Tyler J Lee
(74) *Attorney, Agent, or Firm* — Fish & Richardson P.C.

(57) ABSTRACT

An aircraft airbag inflation system includes an airbag mounted on an external surface of an aircraft. The airbag is configured to inflate in one of multiple stages prior to the aircraft crashing, and each stage is associated with a respective pressure. The system also includes multiple sensors disposed on-board the aircraft and configured to sense aircraft velocities and an aircraft attitude. The system also includes a controller disposed on-board the aircraft and configured to receive multiple signals from the sensors, the multiple signals representing the aircraft velocities and the aircraft attitude sensed by the sensors, determine a crash event for the aircraft based on the received multiple signals, the crash event including an aircraft sink rate, an aircraft attitude at crash time, and an aircraft distance from the impact surface, and determine a stage at which the airbag is to be inflated based on the crash event.

20 Claims, 4 Drawing Sheets

INFLATING ROTORCRAFT EXTERNAL AIRBAGS IN STAGES

TECHNICAL FIELD

This disclosure relates to aircraft safety systems, for example, airbag inflation systems that are external to an aircraft.

BACKGROUND

Some aircraft include safety systems that protect the aircraft and its passengers in the event of an impact (e.g., an impact with the ground or water). Some safety systems include airbags internal to the aircraft that inflate at or near the moment of impact. As another example of a safety system, an aircraft can include external airbags that can be deployed and inflated prior to the impact. Upon impact, the inflated airbags act as cushions that attenuate the impact energy received by the aircraft and its passengers. In this manner, the airbags can reduce structural damage to the aircraft and injury to the passengers.

SUMMARY

This disclosure describes technologies relating to airbag inflation systems that are external to an aircraft.

In some aspects, an aircraft airbag inflation system includes an airbag mounted on an external surface of an aircraft, the airbag configured to inflate in one of multiple stages prior to the aircraft crashing, each stage associated with a respective pressure. The system also includes multiple sensors disposed on-board the aircraft and configured to sense multiple aircraft velocities and an aircraft attitude. The system also includes a controller disposed on-board the aircraft and configured to perform operations including receiving multiple signals from the multiple sensors, the multiple signals representing the multiple aircraft velocities and the aircraft attitude sensed by the multiple sensors, determining a crash event for the aircraft based on the received multiple signals, the crash event including an aircraft sink rate, an aircraft attitude at crash time, and an aircraft distance from the impact surface, and determining a stage at which the airbag is to be inflated based on the crash event.

This, and other aspects, can include one or more of the following features. The airbag can be a first airbag. The system can also include a second airbag and a third airbag, each configured to inflate in one of a respective multiple stages prior to the aircraft crashing, each stage associated with a respective pressure. The multiple stages can include a first stage associated with a first pressure, a second stage associated with a second pressure greater than the first pressure and a third stage associated with a third pressure greater than the second pressure. The controller can be configured to perform operations including determining, based on the determined crash event, that the first airbag is to be inflated to the first stage, the second airbag is to be inflated to the second stage and the third airbag is to be inflated to the third stage. The controller can also be configured to perform operations including transmitting a first signal to inflate the first airbag to the first stage, a second signal to inflate the second airbag to the second stage and a third signal to inflate the third airbag to the third stage. The controller can be configured to inflate each of the first airbag, the second airbag and the third airbag at different times. The multiple aircraft velocities can include a vertical aircraft velocity, a forward aircraft velocity, and a lateral aircraft velocity. The aircraft attitude can include a pitch, a roll, and a yaw. The crash event can include an aircraft body acceleration and an impact surface condition. The operations that the controller is configured to perform can include transmitting a signal representing the determined stage to the airbag, wherein the airbag inflates to a pressure associated with the determined stage prior to the aircraft crashing to prevent aircraft tumbling. The airbag can include multiple inflators, each inflator corresponding to a respective stage, each inflator configured to discharge gas to a pressure associated with the respective stage. The multiple stages can include three stages and the multiple inflators can include three inflators. The controller can be configured to determine that the stage at which the airbag is to be inflated based on the crash event is the second stage, and transmit a first signal and a second signal to a first inflator and a second inflator, respectively, wherein the first inflator and the second inflator discharge gas at a respective pressure to inflate the airbag to the second stage. Determining the crash event for the aircraft based on the received multiple signals can include storing multiple crash event values in a computer-readable storage medium, each crash event value associated with a respective multiple aircraft velocities and aircraft attitude, and comparing the multiple aircraft velocities and the aircraft attitude sensed by the multiple sensors with the stored multiple aircraft velocities and aircraft attitude. Determining the crash event for the aircraft based on the received multiple signals can include solving aircraft flight equations that receive the multiple aircraft velocities and the aircraft attitude as inputs and provide the crash event as the outputs. The aircraft flight equations can be solved in real time.

In some aspects, a method includes receiving multiple signals from multiple sensors disposed on-board an aircraft, the multiple signals representing multiple aircraft velocities and an aircraft attitude sensed by the multiple sensors. The method also includes determining a crash event for the aircraft based on the received multiple signals, the crash event comprising an aircraft sink rate, an aircraft attitude at crash time, and an aircraft distance from the impact surface. The method also includes determining a stage at which an airbag mounted on an external surface of an aircraft is to be inflated based on the crash event, the airbag configured to inflate in one of multiple stages prior to the aircraft crashing, each stage associated with a respective pressure, and transmitting a signal representing the determined stage to the airbag, wherein the airbag inflates to a pressure associated with the transmitted signal.

This, and other aspects, can include one or more of the following features. The airbag can be a first airbag, and the aircraft can include a second airbag and a third airbag, each mounted on an external surface of the aircraft and configured to inflate in one of a respective multiple stages prior to the aircraft crashing, each stage associated with a respective pressure. The multiple stages can include a first stage associated with a first pressure, a second stage associated with a second pressure greater than the first pressure and a third stage associated with a third pressure greater than the second pressure. The method can also include determining, based on the determined crash event, that the first airbag is to be inflated to the first stage, the second airbag is to be inflated to the second stage and the third airbag is to be inflated to the third stage. The method can also include transmitting a first signal to inflate the first airbag to the first stage, a second signal to inflate the second airbag to the second stage and a third signal to inflate the third airbag to the third stage. The airbag can include multiple inflators, each inflator corresponding to a respective stage and each inflator configured to discharge gas to a pressure associated with the respective stage. The multiple stages can include three stages and the multiple inflators can include three inflators. The operations can also include determining that the stage at which the airbag is to be inflated based on the crash event is the second stage, and transmitting a first signal and a second signal to a first inflator and a second inflator, respectively, wherein the first inflator and the second inflator discharge gas at a respective pressure to inflate the airbag to the second stage. The multiple aircraft velocities can include a vertical aircraft velocity, a forward aircraft velocity and a lateral aircraft velocity. The aircraft attitude can include a pitch, a roll, and a yaw. The crash event further can include an aircraft body acceleration and an impact surface condition.

In some aspects, a computer-readable medium storing instructions executable by data processing apparatus performs operations including receiving multiple signals from multiple sensors disposed on-board an aircraft, the multiple signals representing multiple aircraft velocities and an aircraft attitude sensed by the multiple sensors. The operations also include determining a crash event for the aircraft based on the received multiple signals, the crash event including an aircraft sink rate, an aircraft attitude at crash time, and an aircraft distance from the impact surface. The operations also include determining a stage at which an airbag mounted on an external surface of an aircraft is to be inflated based on the crash event, the airbag configured to inflate in one of multiple stages prior to the aircraft crashing, each stage associated with a respective pressure, and transmitting a signal representing the determined stage to the airbag, wherein the airbag inflates to a pressure associated with the transmitted signal.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

This disclosure relates to external airbag inflation systems for an aircraft. For example, the aircraft can be a rotorcraft, tiltrotor, fixed-wing aircraft, airplane, or other type of aircraft. An aircraft crash can be a complex event due to the possible combinations of impact conditions. Under a crash event, an aircraft can have significant forward velocity or large pitch/roll/yaw attitudes. Further, in many cases the impact surface can have different characteristics (e.g., hard, soft soil, watery, inclined, combinations of them, or other characteristics). Some of these conditions can cause aircraft tip-over or tumbling that adversely increases impact severity or injury potential for occupants. Some aircraft have external airbags that are inflated to attenuate the energy from a crash landing. In some cases, the airbags are inflated simultaneously to a fixed initial pressure for all crash scenarios. However, this simple inflation method is not optimal for some crash events with significant forward velocity or pitch/roll attitudes, or for different types of impact surfaces. Additionally, in some cases fully inflated airbags can stop an aircraft impact too abruptly, damaging the aircraft or injuring the occupants.

The present disclosure describes a system and process for inflating external airbags to mitigate impacts from an aircraft crash event. The disclosed system includes a controller that can determine an imminent crash event based on information provided by one or more sensors on the aircraft. For example, the sensors can detect the aircraft sink rate, the aircraft attitude, the aircraft's proximity to the ground, the imminent impact surface type, or other conditions of the aircraft. The controller can interpret signals from the sensors and distinguish characteristics of the crash event, for example, using algorithms, a look-up table, or other techniques. The system also includes one or more airbags, each of which can be inflated to multiple stages (i.e. different pressures). The controller can determine a stage to which an airbag is to be inflated based on the crash event. In this manner, different airbags can be inflated to different pressures. In particular, the different airbags can be inflated to different pressures depending on the characteristics of the crash event as determined by the controller.

The respective stage of each airbag can be selected to reduce the chance of aircraft tumbling or tip-over during the crash event. As other examples, the airbag stages can be selected to maximize energy attenuation, stabilize the aircraft, protect occupants, minimize aircraft structure damage, reduce rebound tendency, or other situations or combinations of situations. For example, the disclosed system can significantly enhance aircraft survivability by adjusting the airbag inflation levels and sequence precisely to control the load mechanisms transmitted to the airframe structures, avoid aircraft tumbling, and subsequently minimize occupant injuries, aircraft structure damage, and equipment on board the aircraft. The stages and airbags can be selected for a variety of crash conditions such as potential crash severity, sink rate, aircraft attitude, aircraft velocities, impact surfaces, or other conditions. In some cases, one or more airbags are not inflated. The airbags can be inflated simultaneously (i.e., in parallel) or in a sequential order (i.e., in series), or in a combination of simultaneous and sequential order. In some cases, the controller can determine that the crash event is a minor crash event (e.g., sink rate less than about 20 ft./sec.), and inflate one or more airbags to a less pressurized stage.

Figure 1:
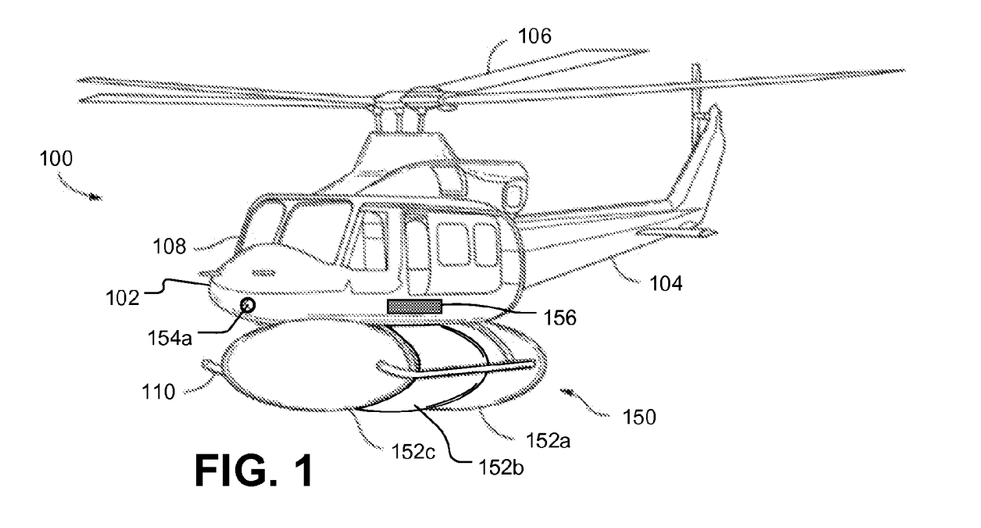
FIG. 1 shows an example aircraft including an example aircraft airbag inflation system.

FIG. 1 shows an example aircraft 100 including an example aircraft airbag inflation system 150. The example aircraft 100 is a rotorcraft that includes a fuselage 102, a tail boom 104, a rotor 106, a cockpit 108, and a landing skid 110 that extends from the lower portion of fuselage 102. The example aircraft airbag inflation system 150 includes a first airbag 152a, a second airbag 152b, and a third airbag 152c. In FIG. 1, the example airbags 152a-c are shown in an inflated state. The airbags 152a-c can be mounted on an external surface of aircraft 100 and are shown in example positions on the underside of the aircraft 100. The airbags 152a-c can be mounted to the aircraft 100 in a deflated state and inflated prior to a crash. In some implementations, the airbags 152a-c are mounted to an internal structure of the aircraft 100 and deployed externally. For example, the airbags 152a-c can be mounted on an internal structure of the aircraft 100 and covered with a thin panel, non-structural fairing, or other covering. The example system 150 includes three airbags 152a-c, but in other implementations another number of airbags can be included. For example, the system 150 can include 1, 2, 6, 12, 16, 22, 24, or another number of airbags. Each of the airbags 152a-c can have a cylindrical shape, a spheroidal shape, an irregular shape, or another shape. In some cases, an airbag includes one or more vents to release gas within the airbag.

Each of the airbags 152a-c is configured to inflate in one of multiple stages prior to aircraft 100 crashing, and each stage can be associated with a respective pressure. For example, a first stage can be associated with a first pressure, a second stage can be associated with a second pressure greater than the first pressure, and a third stage can be associated with a third pressure greater than the second pressure. The airbag inflation system 150 also includes a controller 156, and one or more sensors 154a-c (an example sensor 154a is shown). To inflate an airbag in multiple stages, in some implementations, the controller 156 can inflate the airbag first to the first stage, then to the second stage, and so on. Alternatively, in some implementations, the controller 156 can skip stages while inflating the airbag. For example, the controller 156 can inflate the airbag first to the first stage, then to the third stage or first to the second stage, then to the third stage. Different airbags can be inflated at different times regardless of whether the inflation pressure (i.e. stage) is the same or different for each airbag.

Figure 2:
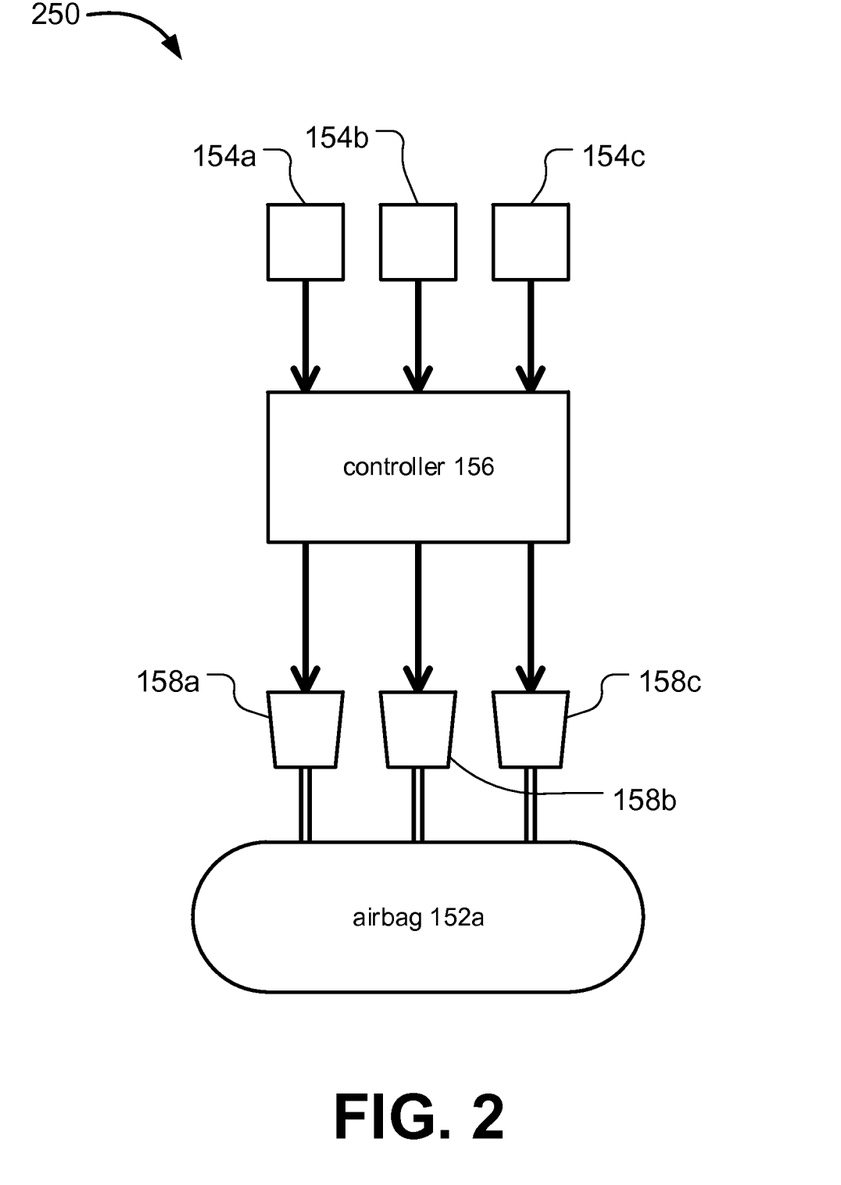
FIG. 2 shows a schematic diagram of a portion of an example aircraft airbag inflation system.

FIG. 2 shows a schematic diagram of a portion of example aircraft airbag inflation system 150. As shown in FIG. 2, the example airbag 152a can be coupled to multiple example inflators 158a-c that discharge gas to inflate the airbag 152a. Example system 150 shows a first inflator 158a, a second inflator 158b, and a third inflator 158c, but in other implementations more or fewer inflators can be used. Each inflator 158a-c can be connected to the airbag 152a via respective conduits, as shown in FIG. 2. In some implementations, the inflators 158a-c are incorporated into airbag 152a. In some implementations, each inflator 158a-c is a separate unit and is configured to inflate the airbag 152a to a respective pressure. In some implementations, the inflators 158a-c are all disposed within the same housing and can be connected to the airbag 152a via a single conduit. The inflators 158a-c are communicatively coupled to controller 156, and are configured to inflate the airbag 152a upon receiving a signal from controller 156. Each inflator 158a-c discharges gas, for example, from a gas source (not shown), into the airbag 152a to a respective pressure. FIG. 2 shows inflators 158a-c connected to airbag 152a, but each airbag 152a-c in the system 150 can have one or more separate inflators connected to it. In some cases, the airbag includes multiple chambers, and one or more inflators are connected to each chamber.

The inflators 158a-c can be configured to provide different pressures to airbag 152a, each pressure corresponding to a different stage. In some implementations, each inflator 152a-c corresponds to a respective stage, and each inflator 152a-c is configured to discharge gas to a pressure associated with the respective stage. For example, the first inflator 158a can inflate the airbag 152a to a first pressure corresponding to a first stage, the second inflator 158b to a second pressure corresponding to a second stage, and the third inflator 158c to a third pressure corresponding to a third stage.

In some implementations, each inflator 158a-c is configured to provide gas at the same pressure, and multiple inflators 158a-c are used simultaneously to supply different pressures for different stages. For example, the first inflator 158a by itself can be used to inflate the airbag 152a to a first pressure corresponding to a first stage. Both the first and second inflators 158a-b can be used to inflate the airbag 152a to a second pressure corresponding to a second stage, where the second pressure is approximately twice that of the first pressure. Likewise, all three inflators 158a-c can be used to inflate the airbag to a third pressure corresponding to a third stage, where the third pressure is approximately three times that of the first pressure. In other implementations, inflators 158a-c provide unequal pressures and the inflators 158a-c are used in different combinations to inflate the airbag 152a to different pressures corresponding to different stages. The inflators 158a-c can be a pyrotechnic inflator, a compressed gas inflator, or another type of inflator.

The example system 150 includes three sensors 154a-c disposed on-board the aircraft, but in other implementations more or fewer sensors can be included. In some cases, two or more of the sensors 154a-c are included in a single sensor component. FIG. 1 shows sensor 154a in an example location on the aircraft 100, though sensors 154a-c can be at other locations on-board the aircraft 100. In some cases, one or more of the sensors 154a-c are part of another system on the aircraft 100 (e.g., avionics, Global Positioning System (GPS), navigation, or other aircraft system). The sensors 154a-c can be configured to sense one or more aircraft velocities and an aircraft attitude. For example, the sensors 154a-c can sense sink rate, vertical aircraft velocity, forward aircraft velocity, lateral aircraft velocity, pitch, roll, yaw, aircraft body acceleration, distance to the impact surface, or other characteristics or conditions. In some cases, the sensors 154a-c detect the impact surface conditions, such as incline or type of surface (e.g., water, grass, forest, dirt, street, etc.). In some cases, the sensors 154a-c include a GPS, LIDAR, camera, or other kind of sensor to detect or determine impact surface conditions. In some cases, a single sensor 154a-c can sense more than one characteristic or condition, as described above.

The sensors 154a-c and the inflators 158a-c are communicatively coupled to example controller 156, as shown in FIG. 2. The sensors 154a-c can transmit signals to the controller 156 that represent aircraft velocities, sink rate, or other sensed conditions as described previously. The controller 156 can transmit signals to inflators (e.g inflators 158a-c) to inflate the airbags 152a-c to stages determined by the controller 156. The controller 156 sends transmits to activate the inflators 158a-c prior to the occurrence of a crash. In some cases, the controller 156 is configured to inflate each of the multiple airbags 152a-c at different times. The controller 156 can determine a crash event for the aircraft 100 based on the received sensor signals and determine stages at which one or more airbags 152a-c are to be inflated based on the crash event. In some cases, the controller 156 can transmit signals to inflators after the occurrence of a crash (e.g., immediately after impact).

In some implementations, the controller 156 determines a crash event in part by using multiple crash event values stored in a computer-readable storage medium. The crash event and crash event values can be stored as data in a look-up table, a database, a list, or in another data structure. For example, each crash event value can be associated with respective aircraft parameters, for example, aircraft velocities, aircraft attitude, and/or other aircraft parameters. The controller 156 can compare the aircraft velocities and the aircraft attitude sensed by the sensors 154a-c with the stored aircraft velocities and aircraft attitude. In this manner, the controller 156 can compare the sensed values of current aircraft conditions to a set of crash events and their associated values. A certain crash event can be determined, for example, by determining that a set of sensed values is most similar to a stored set of values associated with a crash event.

In some implementations, the controller 156 determines a crash event in part by solving aircraft flight equations. For example, the aircraft flight equations can receive aircraft velocities and the aircraft attitude as inputs and provide the crash event as the outputs. The aircraft flight equations can be associated with a crash model, a probabilistic crash model, a finite-element crash model, or another model or system of equations. In some cases, the aircraft flight equations are solved continuously or in "real time" (i.e., in a time duration that is nearly imperceptible, for example less than several milliseconds). In some implementations, the controller 156 is included as part of another system, such as a computer system or other data processing apparatus. For example, the controller 156 can be incorporated as part of the avionics system on an aircraft.

Based on the determined crash event, the controller 156 is configured to determine the stages and times at which multiple external airbags 152*a-c* are to be inflated. As an example scenario, aircraft 100 can undergo a crash in which the nose of the aircraft 100 is pitched downward and the aircraft 100 is tilted toward the right side of the aircraft 100. In this case, the controller 156 can firstly inflate a first airbag located near the nose of the aircraft 100. Then, after the impact, the tail of the aircraft 100 begins to drop toward the ground (i.e., the impact surface), and the controller 156 can secondly inflate a second airbag located near the tail of the aircraft 100. The second airbag cushions the tail as the tail impacts the ground. Then, the aircraft 100 begins to roll to the left, and the controller 156 can thirdly inflate a third airbag to maintain the aircraft 100 in a relatively upright position. Each of the airbags can be inflated to different stages as determined to be appropriate by the controller 156.

As another example scenario, aircraft 100 can undergo a crash into water (i.e., the impact surface) in which the aircraft 100 is tilted to the right. The controller 156 can inflate airbags mounted on the right side of the aircraft 100 to relatively high-pressure stages to absorb impact energy. The controller 156 can also (simultaneously or sequentially) inflate airbags mounted on the left side of the aircraft 100 to provide a balanced buoyancy for the aircraft 100 on the water and maintain the aircraft 100 in a relatively upright position. These are example scenarios; other crash scenarios and aircraft airbag inflation system responses are possible.

Figure 3:
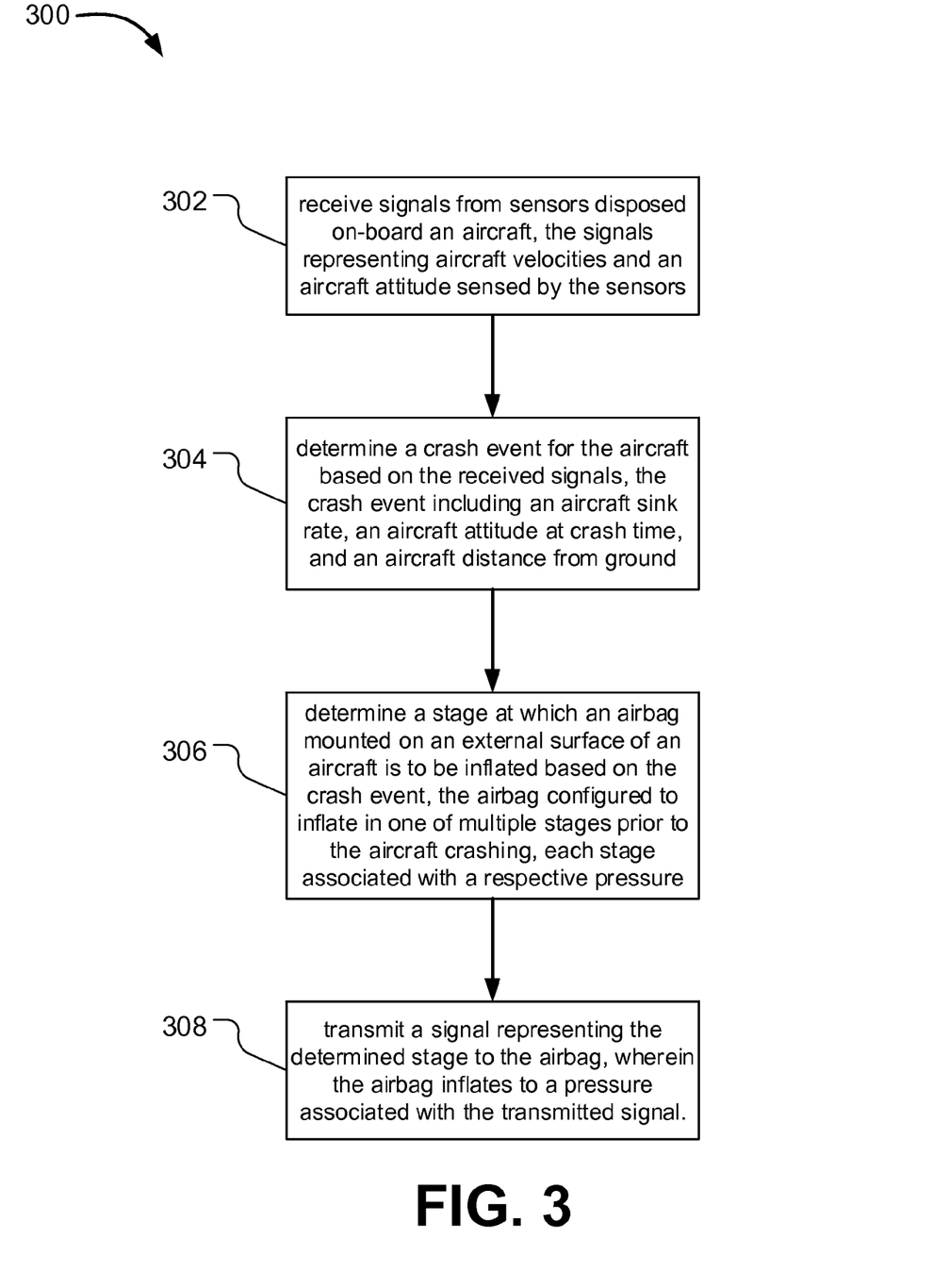
FIG. 3 is a flowchart of a of an example process for inflating external airbags of an aircraft.
Figure 4A:
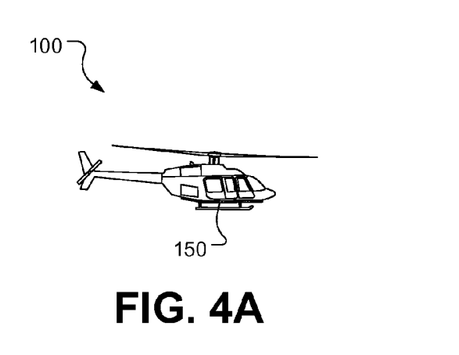
FIGS. 4A-4D show an example implementation of an aircraft including aircraft airbag inflation system.
Figure 4B:
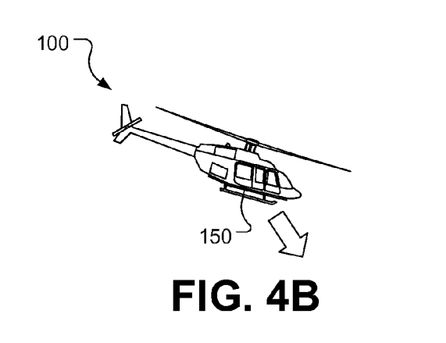
Figure 4C:
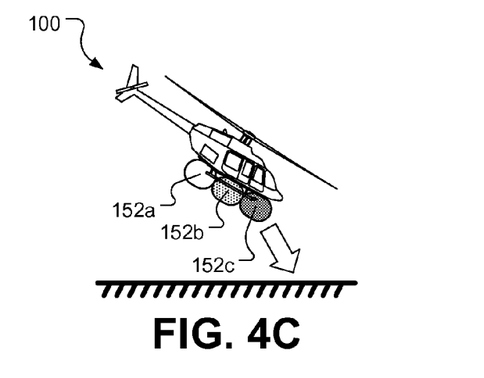
Figure 4D:
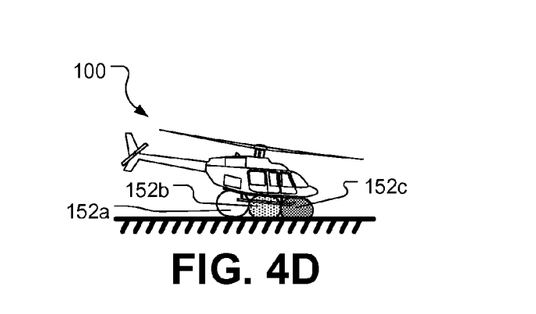

FIG. 3 is a flowchart of an example process 300 for inflating external airbags of an aircraft. The example process 300 can be implemented, for example, by some or all of the aircraft airbag inflation system 150 shown in FIG. 1 and FIG. 2. FIGS. 4A-4D show another example implementation of aircraft 100 including aircraft airbag inflation system 150 that can be implemented by the example process 300. FIG. 4A shows example aircraft 100 in typical flight prior to a crash event. FIG. 4B shows example aircraft 100 at the beginning of an example crash event. FIG. 4C shows example aircraft 100 prior to an example crash event impact and in which multiple external airbags 152*a-c* have been inflated. FIG. 4D shows example aircraft 100 after an example crash event.

At 302, signals are received from sensors disposed onboard the aircraft. The signals can represent, among other conditions, aircraft velocities and an aircraft attitude sensed by the sensors. For example, signals from sensors 154*a-c* can be received by controller 156 as described previously. The signals can be received continuously or periodically.

At 304, a crash event is determined for the aircraft based on the received signals. The crash event can be determined by a controller such as controller 156. A crash event can include an aircraft sink rate, an aircraft attitude, an aircraft distance from the impact surface, or other conditions as described previously. For example, for the nominal flight shown in FIG. 4A, the controller can determine, based on signals from the sensors, that no crash event is occurring or is possible. For the aircraft in FIG. 4B undergoing a crash event, the controller can determine the potential crash event based on signals from the sensors.

At 306, based on the crash event, stages are determined at which multiple airbags are inflated. The multiple airbags can be mounted on an external surface of the aircraft. The airbags can be configured to inflate in one of multiple stages prior to the aircraft crashing, and each stage can be associated with a respective pressure. The stages can be determined by a controller such as controller 156. For example, based on the determined crash event, a first stage can be determined for a first airbag, a second stage can be determined for a second airbag, and a third stage can be determined for a third airbag. In some cases, the determined crash event can be changed or updated, and the airbag stages can be re-determined accordingly.

At 308, signals representing the determined stages are transmitted to the multiple airbags. The airbags are inflated to pressures associated with the transmitted signals. A controller such as controller 156 can transmit the signals to inflators such as inflators 158*a-c*. In some cases, the signals are transmitted to the airbags in parallel, and in some cases the signals are transmitted to the airbags serially. For example, the multiple airbags 152*a-c* can be inflated simultaneously or at different times. In some cases, the controller can determine time delays between sequential airbag inflations and transmit signals to the airbags accordingly. For example, in FIG. 4C, the controller 156 has determined appropriate stages for airbags 152*a-c* based on the crash event and transmitted signals to the airbags 152*a-c* to inflate the airbags 152*a-c* to their respective determined stages. FIG. 4D shows aircraft 100 after the crash event in which the inflated airbags 152*a-c* have absorbed the impact such that the aircraft is prevented 100 from tumbling or tipping, as the controller determined.

In some cases, the aircraft condition detected by the sensors can change after a first crash event is determined, and a new second crash event can be determined based on the changed aircraft conditions. The controller can determine different airbag stages for the second crash event and transmit new signals to the airbags. In some cases, the new signals are transmitted to the airbags after previous signals associated with the first crash event have already been sent. For example, a change in aircraft sink rate during a crash can cause a new crash event to be determined that is based on the new sink rate. As another example, an aircraft can begin to tumble during a crash, and signals can be transmitted to inflated airbags to inflate the airbags to different stages to reduce or prevent tumbling. As another example, for a crash scenario with large forward velocity but with minor sink speed, one or more stages corresponding to relatively low pressures can be determined to attenuate the minor vertical energy. After impact, while the aircraft is still moving forward due to its large initial forward velocity, other stages corresponding to greater pressures can be determined for airbags located near the front of the aircraft to provide cushioning. Other crash situations and airbag configurations are possible.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An aircraft airbag inflation system comprising:
  a first airbag, a second airbag, and a third airbag each mounted on an external surface of an aircraft, each of the first airbag, the second airbag, and the third airbag configured to inflate in one of a plurality of stages prior to the aircraft crashing, each stage associated with a respective pressure, the plurality of stages comprising a first stage associated with a first pressure, a second stage associated with a second pressure greater than the first pressure, and a third stage associated with a third pressure greater than the second pressure;
  a plurality of sensors disposed on-board the aircraft and configured to sense a plurality of aircraft velocities and an aircraft attitude; and
  a controller disposed on-board the aircraft and configured to perform operations comprising:
    receiving a plurality of signals from the plurality of sensors, the plurality of signals representing the plurality of aircraft velocities and the aircraft attitude sensed by the plurality of sensors,
    determining a crash event for the aircraft based on the received plurality of signals, the crash event comprising an aircraft sink rate, an aircraft attitude at crash time, and an aircraft distance from an impact surface, and
    determining a stage at which the airbags are to be inflated based on the crash event, comprising determining, based on the determined crash event, that the first airbag is to be inflated to the first stage, the second airbag is to be inflated to the second stage, and the third airbag is to be inflated to the third stage.

2. The system of claim 1, wherein the controller is configured to perform operations comprising:
  transmitting a first signal to inflate the first airbag to the first stage, a second signal to inflate the second airbag to the second stage and a third signal to inflate the third airbag to the third stage.

3. The system of claim 1, wherein the controller is configured to inflate each of the first airbag, the second airbag and the third airbag at different times.

4. The system of claim 1, wherein the plurality of aircraft velocities comprise a vertical aircraft velocity, a forward aircraft velocity and a lateral aircraft velocity.

5. The system of claim 1, wherein the aircraft attitude comprises a pitch, a roll and a yaw.

6. The system of claim 1, wherein the crash event further comprises an aircraft body acceleration and an impact surface condition.

7. The system of claim 1, wherein the operations that the controller is configured to perform comprise transmitting a signal representing the determined stage to the airbag, wherein the airbag inflates to a pressure associated with the determined stage prior to the aircraft crashing to prevent aircraft tumbling.

8. The system of claim 1, wherein the airbag comprises a plurality of inflators, each inflator corresponding to a respective stage, each inflator configured to discharge gas to a pressure associated with the respective stage.

9. The system of claim 8, wherein the plurality of stages comprises three stages and the plurality of inflators comprises three inflators, and wherein the controller is configured to:
  determine that the stage at which the airbag is to be inflated based on the crash event is the second stage; and
  transmit a first signal and a second signal to a first inflator and a second inflator, respectively, wherein the first inflator and the second inflator discharge gas at a respective pressure to inflate the airbag to the second stage.

10. The system of claim 1, wherein determining the crash event for the aircraft based on the received plurality of signals, the crash event comprising the aircraft sink rate, the aircraft attitude at crash time, and the aircraft distance from the impact surface comprises:
  storing a plurality of crash event values in a computer-readable storage medium, each crash event value associated with a respective plurality of aircraft velocities and aircraft attitude; and
  comparing the plurality of aircraft velocities and the aircraft attitude sensed by the plurality of sensors with the stored plurality of aircraft velocities and aircraft attitude.

11. The system of claim 1, wherein determining the crash event for the aircraft based on the received plurality of signals, the crash event comprising the aircraft sink rate, the aircraft attitude at crash time, and the aircraft distance from the impact surface comprises solving aircraft flight equations that receive the plurality of aircraft velocities and the aircraft attitude as inputs and provide the crash event as outputs.

12. The system of claim 11, wherein the aircraft flight equations are solved in real time.

13. A method comprising:
  receiving a plurality of signals from a plurality of sensors disposed on-board an aircraft, the plurality of signals representing a plurality of aircraft velocities and an aircraft attitude sensed by the plurality of sensors;
  determining a crash event for the aircraft based on the received plurality of signals, the crash event comprising an aircraft sink rate, an aircraft attitude at crash time, and an aircraft distance from an impact surface;
  determining a stage at which a first airbag, a second airbag, and a third airbag mounted on an external surface of an aircraft are to be inflated based on the crash event, each of the first airbag, the second airbag, and the third airbag configured to inflate in one of a plurality of stages prior to the aircraft crashing, each stage associated with a respective pressure, wherein the plurality of stages comprises a first stage associated with a first pressure, a second stage associated with a second pressure greater than the first pressure, and a third stage associated with a third pressure greater than the second pressure;
  determining, based on the determined crash event, that the first airbag is to be inflated to the first stage, the second airbag is to be inflated to the second stage, and the third airbag is to be inflated to the third stage; and
  transmitting a signal representing the determined stage to the airbags, wherein the airbags inflate to a pressure associated with the transmitted signal, wherein transmitting a signal comprises transmitting a first signal to inflate the first airbag to the first stage, a second signal to inflate the second airbag to the second stage, and a third signal to inflate the third airbag to the third stage.

14. The method of claim 13, wherein the airbags comprise a plurality of inflators, each inflator corresponding to a respective stage, each inflator configured to discharge gas to a pressure associated with the respective stage, wherein the plurality of stages comprises three stages and the plurality of inflators comprises three inflators, and wherein the operations further comprise:
- determining that the stage at which the second airbag is to be inflated based on the crash event is the second stage; and
- transmitting a first inflator signal and a second inflator signal to a first inflator and a second inflator, respectively, wherein the first inflator and the second inflator discharge gas at a respective pressure to inflate the second airbag to the second stage.

15. The method of claim 13, wherein the plurality of aircraft velocities comprise a vertical aircraft velocity, a forward aircraft velocity and a lateral aircraft velocity.

16. The method of claim 13, wherein the aircraft attitude comprises a pitch, a roll and a yaw.

17. The method of claim 13, wherein the crash event further comprises an aircraft body acceleration and an impact surface condition.

18. A non-transitory computer-readable medium storing instructions executable by data processing apparatus to perform operations comprising:
- receiving a plurality of signals from a plurality of sensors disposed on-board an aircraft, the plurality of signals representing a plurality of aircraft velocities and an aircraft attitude sensed by the plurality of sensors;
- determining a crash event for the aircraft based on the received plurality of signals, the crash event comprising an aircraft sink rate, an aircraft attitude at crash time, and an aircraft distance from an impact surface;
- determining a stage at which a first airbag, a second airbag, and a third airbag mounted on an external surface of an aircraft are to be inflated based on the crash event, each of the first airbag, the second airbag, and the third airbag configured to inflate in one of a plurality of stages prior to the aircraft crashing, each stage associated with a respective pressure, wherein the plurality of stages comprises a first stage associated with a first pressure, a second stage associated with a second pressure greater than the first pressure, and a third stage associated with a third pressure greater than the second pressure;
- determining, based on the determined crash event, that the first airbag is to be inflated to the first stage, the second airbag is to be inflated to the second stage, and the third airbag is to be inflated to the third stage; and
- transmitting a signal representing the determined stage to the airbags, wherein the airbags inflate to a pressure associated with the transmitted signal, wherein transmitting a signal comprises transmitting a first signal to inflate the first airbag to the first stage, a second signal to inflate the second airbag to the second stage, and a third signal to inflate the third airbag to the third stage.

19. An aircraft airbag inflation system comprising:
- an airbag mounted on an external surface of an aircraft, the airbag configured to inflate in one of a plurality of stages prior to the aircraft crashing, each stage associated with a respective pressure;
- a plurality of sensors disposed on-board the aircraft and configured to sense a plurality of aircraft velocities and an aircraft attitude; and
- a controller disposed on-board the aircraft and configured to perform operations comprising:
  - receiving a plurality of signals from the plurality of sensors, the plurality of signals representing the plurality of aircraft velocities and the aircraft attitude sensed by the plurality of sensors,
  - determining a crash event for the aircraft based on the received plurality of signals, the crash event comprising an aircraft sink rate, an aircraft attitude at crash time, and an aircraft distance from an impact surface, wherein determining a crash event comprises:
    - storing a plurality of crash event values in a computer-readable storage medium, each crash event value associated with a respective plurality of aircraft velocities and aircraft attitude; and
    - comparing the plurality of aircraft velocities and the aircraft attitude sensed by the plurality of sensors with the stored plurality of aircraft velocities and aircraft attitude; and
  - determining a stage at which the airbag is to be inflated based on the crash event.

20. A method comprising:
- receiving a plurality of signals from a plurality of sensors disposed on-board an aircraft, the plurality of signals representing a plurality of aircraft velocities and an aircraft attitude sensed by the plurality of sensors;
- determining a crash event for the aircraft based on the received plurality of signals, the crash event comprising an aircraft sink rate, an aircraft attitude at crash time, and an aircraft distance from an impact surface;
- determining a stage at which an airbag mounted on an external surface of an aircraft is to be inflated based on the crash event, the airbag configured to inflate in one of a plurality of stages prior to the aircraft crashing, each stage associated with a respective pressure, wherein the airbag comprises a plurality of inflators, each inflator corresponding to a respective stage, each inflator configured to discharge gas to a pressure associated with the respective stage;
- determining that the stage at which the airbag is to be inflated based on the crash event is a second stage of the plurality of stages; and
- transmitting a signal representing the determined stage to the airbag, wherein the airbag inflates to a pressure associated with the transmitted signal, the transmitting comprising transmitting a first signal and a second signal to a first inflator and a second inflator, respectively, of the plurality of inflators, wherein the first inflator and the second inflator discharge gas at a respective pressure to inflate the airbag to the second stage.

* * * * *